US011559864B2

(12) United States Patent
Patrini et al.

(10) Patent No.: US 11,559,864 B2
(45) Date of Patent: Jan. 24, 2023

(54) TOOL CHANGER DEVICE FOR A ROBOTIC ARM

(71) Applicant: EFFECTO GROUP S.P.A., Milan (IT)

(72) Inventors: Giovanni Patrini, Crema (IT); Stefan Casey, Rock City Falls, NY (US)

(73) Assignee: EFFECTO GROUP S.P.A., Milan (IT)

( * ) Notice: Subject to any disclaimer, the term of this patent is extended or adjusted under 35 U.S.C. 154(b) by 829 days.

(21) Appl. No.: 16/444,506

(22) Filed: Jun. 18, 2019

(65) Prior Publication Data

US 2019/0381617 A1 Dec. 19, 2019

(30) Foreign Application Priority Data

Jun. 18, 2018 (IT) .......................... 102018000006402

(51) Int. Cl.
*G06F 17/00* (2019.01)
*B23Q 3/155* (2006.01)
*B25J 15/04* (2006.01)

(52) U.S. Cl.
CPC ...... *B23Q 3/15553* (2013.01); *B25J 15/0491* (2013.01)

(58) Field of Classification Search
CPC .............. B23Q 3/15553; B23Q 3/1554; B23Q 2003/155404; B23Q 2003/155456; B25J 15/0491; B25J 15/0466; B25J 15/04; B25J 13/087; B25J 19/066; B25J 19/00
USPC .......................................................... 403/31
See application file for complete search history.

(56) References Cited

U.S. PATENT DOCUMENTS

| 11,198,223 | B2 * | 12/2021 | Thunell ................... B25J 15/04 |
| 2016/0052146 | A1 * | 2/2016 | Berrocal .............. B25J 15/0441 |
| | | | 483/1 |
| 2016/0059424 | A1 * | 3/2016 | Zachary ............... B25J 15/0416 |
| | | | 483/1 |
| 2019/0375067 | A1 * | 12/2019 | Berrocal .............. B23Q 3/1554 |

FOREIGN PATENT DOCUMENTS

| DE | 202018102683 U1 | 5/2018 |
| JP | 60123287 A | 7/1985 |
| WO | 2017212790 A1 | 12/2017 |

* cited by examiner

*Primary Examiner* — Ronnie M Mancho
(74) *Attorney, Agent, or Firm* — Browdy and Neimark, PLLC

(57) ABSTRACT

A tool changer device for a robotic arm comprising a robot adapter (1) particularly adapted to be connected to a robotic arm (5) and to a tool (6). The robot adapter (1) comprises a pneumatic cylinder (117) inside which a piston (116) is slidably arranged for activating a coupling and uncoupling mechanism (120) of the robotic arm (5) to the tool (6). On one of the walls of the robot adapter (1) at least four through conduits (24, 25, 26, 27) are arranged, one end of which opens into the pneumatic cylinder (117) and another end of which opens outside of the pneumatic cylinder (117). The device further comprises a first differential pressure sensor (18) connected to at least two of the through conduits (24, 25), and a second differential pressure sensor (19) connected to another two of the through conduits (26, 27).

12 Claims, 6 Drawing Sheets

TOOL CHANGER DEVICE FOR A ROBOTIC ARM

TECHNICAL FIELD

The present invention relates to the sector of robotics and in particular to the sector of robotic tool changer devices particularly adapted to be coupled with a robotic arm. The present invention has been developed with particular reference, although without being limited, to a tool changer device with a safety control.

BACKGROUND

Robotic systems are assemblies of machines that comprise one or more industrial robots, or manipulators for various uses, automatically controlled or programmable to perform movements on three or more axes.

Their use is increasingly common in many and different industrial applications, from logistics to painting, assembly, welding, etc. Within these systems there is therefore the need for a robot to use various tools to perform different functions from each other and therefore for the robot to be equipped with a tool changer device particularly adapted to be coupled to a robotic arm. The integration and installation of industrial robots and robotic tools in production lines implies particular hazards. International standards have already identified these hazards and envisage a series of minimum safety requirements that must be adopted by those involved with a robotic system (manufacturer, supplier, integrator and user) to guarantee a safe work environment. Necessary safety requirements for actuating the uncoupling of a tool changer can, for example, be:

- when the tool changer is coupled with the tool (robot side and tool side coupled) and it is in its parking station, or
- when it is not in the parking station (or is moving) but the tool is not coupled to the robot adapter (the robot adapter is free).

A further fundamental condition for guaranteeing safety is that the tool changer is supplied with a predetermined energy value envisaged for its operation (pneumatic energy, electrical energy, hydraulic or the like). In fact, the reduction of the supplied energy value or its insufficiency according to criteria established in the design of the tool changer or its variation beyond design values can cause, in the short or long term, uncoupling situations in unsafe and therefore very dangerous conditions.

Generally, tool changer manufacturers envisage for safety reasons a redundancy mechanism (mechanical or another type) that prevents uncoupling also in the condition of loss of the energy necessary for the operation of the tool changer. However, such solutions have not shown to be sufficient to guarantee safety.

Therefore, the need has arisen to design and produce robotic tools able to guarantee that the loss or variation of the energy supply (e.g. electrical, hydraulic, pneumatic, vacuum power supply) does not cause the release of the load that could result in a dangerous condition. The need has also arisen to ensure that such robotic equipment guarantees that the release of releasable tools only takes place in designated locations or in specific and controlled conditions, if the release could cause a dangerous situation, a very probably occurrence with reference to a tool changer.

The Applicant has performed several experiments and research and development activities in order to identify a solution able to provide safety control associated with the tool changer in a robotic application that ensures that the tool changer itself cannot be uncoupled unless one or more safety conditions are verified. This includes the consideration that an uncoupling command may not be applied to the tool changer unless the necessary safety conditions are complied with.

In virtue of the above, an object of the present invention is that of providing a solution to such requirements.

This and other objects are reached through the embodiments of the invention comprising the technical characteristics defined in the main claim. The dependent claims outline preferred and/or particularly advantageous aspects of the invention.

DISCLOSURE OF THE INVENTION

An aspect of the invention according to the present invention provides a tool changer device for a robotic arm, comprising:

- a robot adapter particularly adapted to be connected to a robotic arm and to a tool;
- the robot adapter comprising a pneumatic cylinder inside which a piston is slidably arranged for activating a coupling and uncoupling mechanism of the robotic arm to the tool; characterized in that on one of the walls of the robot adapter at least four through conduits are arranged, one end of which opens into the pneumatic cylinder and another end of which opens outside of the pneumatic cylinder;
- the device further comprising a first differential pressure sensor connected to at least two of the through conduits, and a second differential pressure sensor connected to another two of the through conduits.

Thanks to such solution, it is possible to detect not only the coupled and uncoupled positions of the coupling and uncoupling device but also the intermediate ones obtaining a more direct detection, and therefore increasing the safety of the tool changer device.

Another aspect of the invention envisages that each differential pressure sensor comprises at least two compressed air inlet ports, said ports being in fluid connection with said through conduits.

A further aspect of the present invention envisages that each differential pressure sensor comprises at least one output particularly adapted to provide an analog or digital output signal to an electrical processing circuit.

Thanks to such solution, it is possible to detect missing or insufficient air pressure, which constitutes a dangerous failure of the system, and to block the subsequent uncoupling request.

Another aspect of the present invention envisages that the device comprises a tool adapter particularly adapted to be connected to a tool.

A further aspect of the present invention envisages a robot adapter safety control module, connected to the robot adapter, and a tool adapter safety control module connected to the tool adapter. Thanks to such solution, it is possible to realize a safety control architecture with two channels that make cross monitoring between them.

Another aspect of the present invention envisages that the robot adapter safety module comprises a safety control circuit.

Thanks to such solution it is possible to prevent a single failure leading to the loss of the safety function.

Yet another aspect of the present invention envisages that the safety control circuit comprises two actuation devices connected in series to an uncoupling conduit particularly adapted to supply the cylinder from the side that activates the uncoupling.

Thanks to such solution, it is possible to realize an AND pneumatic logic that further increases the safety conditions for preventing the uncoupling of the tool from the robotic arm.

A further aspect of the present invention envisages that one of said actuation devices is connected to a coupling conduit particularly adapted to supply the cylinder from the side that activates the coupling.

Thanks to such solution, it is possible to realize an OR pneumatic logic.

Another aspect of the present invention envisages the actuation devices being bi-stable pneumatic solenoid valves.

Yet another aspect of the present invention envisages the robot adapter safety module comprising an extra safety circuit, said circuit comprising two pressure sensors connected to a pneumatic supply air conduit of the safety control module or connected to at least two of the through conduits arranged on the pneumatic cylinder of the robot adapter, and two actuation devices arranged in series and connected to the uncoupling conduit.

In a variant of the present invention two pressure sensors are connected to two of the four through conduits to sense the air pressure inside the pneumatic cylinder and the output signals of these sensors are used by the robot adapter safety module.

Thanks to such solution, it is possible to prevent the dangerous uncoupling of the tool in the event that the operator ignores the electrical safety signals provided by the safety control, or the user does not integrate them into their safety control measures and the operator activates the robot with the tool changer in the absence of air supply.

Another aspect of the present invention provides at least a tool presence sensor, which is particularly adapted to detect the coupling of the tool adapter to the robot adapter.

A further aspect of the present invention provides that the tool presence sensor may be located in the robot adapter safety module.

BRIEF DESCRIPTION OF THE DRAWINGS

Further characteristics and advantages of the present invention shall become clearer from the following description, provided by way of example with reference to the appended figures wherein.

BEST WAY TO ACTUATE THE INVENTION

Figure 4:
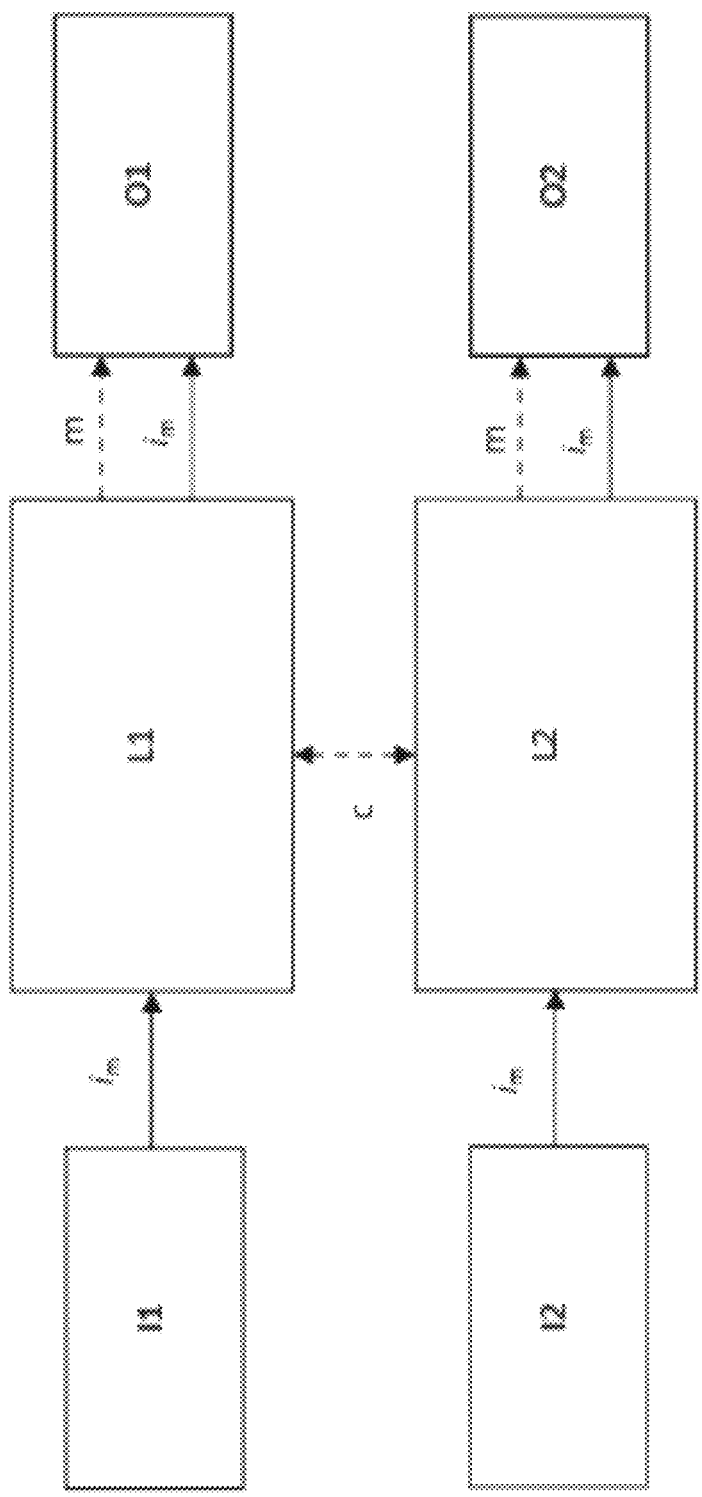
FIG. 4 is a schematic representation of a safety control structure of a tool changer.

As illustrated in FIG. 4, a safety control structure, or architecture, for a tool changer is characterized by redundancy, i.e. by two parallel channels, each channel with a respective input device I1, I2, a respective control logic L1, L2 and a respective output device O1, O2 connected to each other through interconnecting elements $i_m$. The two control logics L1, L2 of the two channels are possibly subject to cross monitoring 'c' and each output device O1, O2 is subject to monitoring 'm' by the channel logic for a possible failure (where the detection of the failure is reasonably practicable).

Further, a single failure does not lead to the loss of the safety function. If it is reasonably practicable, the single failure must be detected during or prior to the subsequent safety function request.

Figure 1:
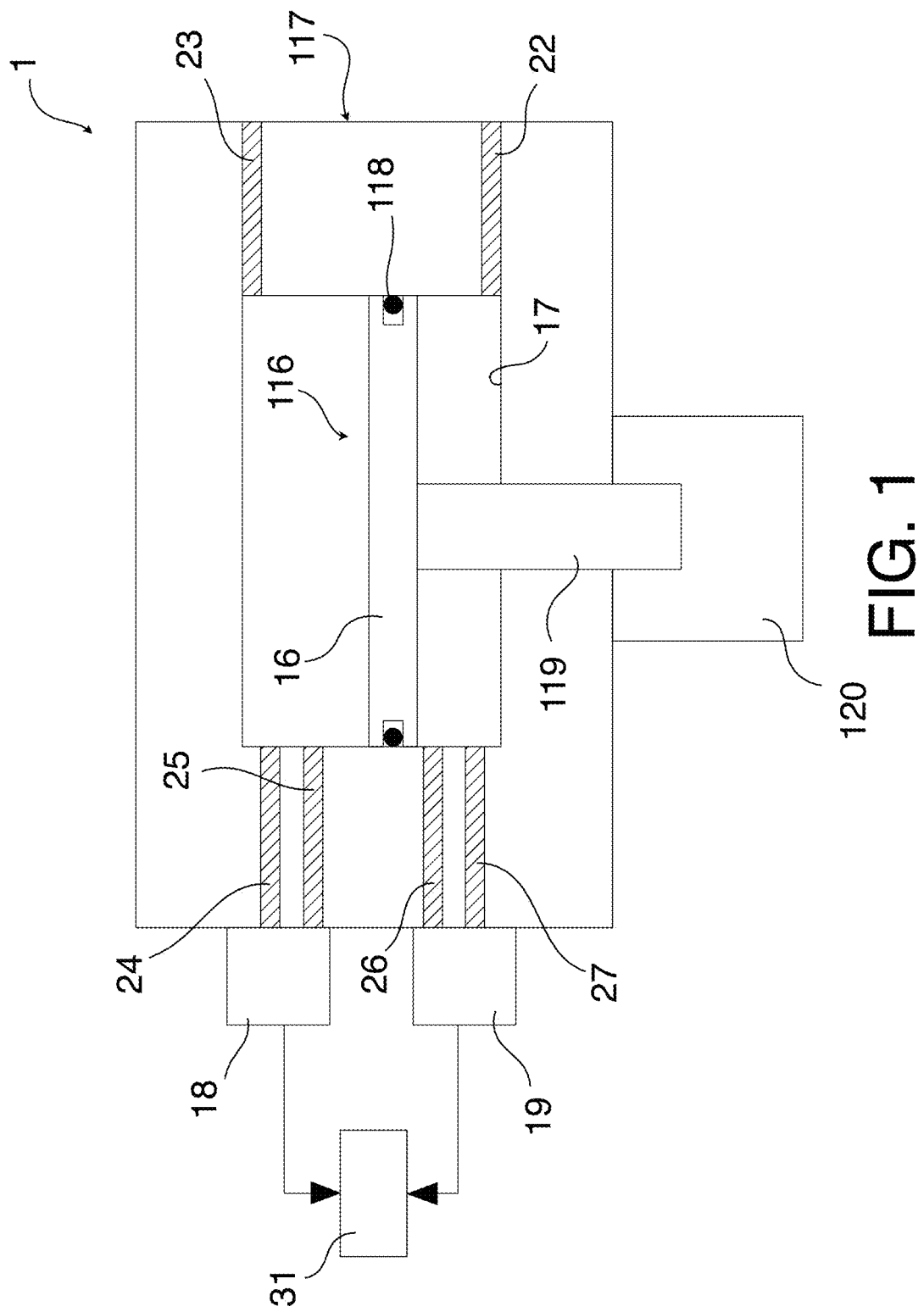
FIG. 1 is a schematic sectional view of a robot adapter according to the present invention.
Figure 2:
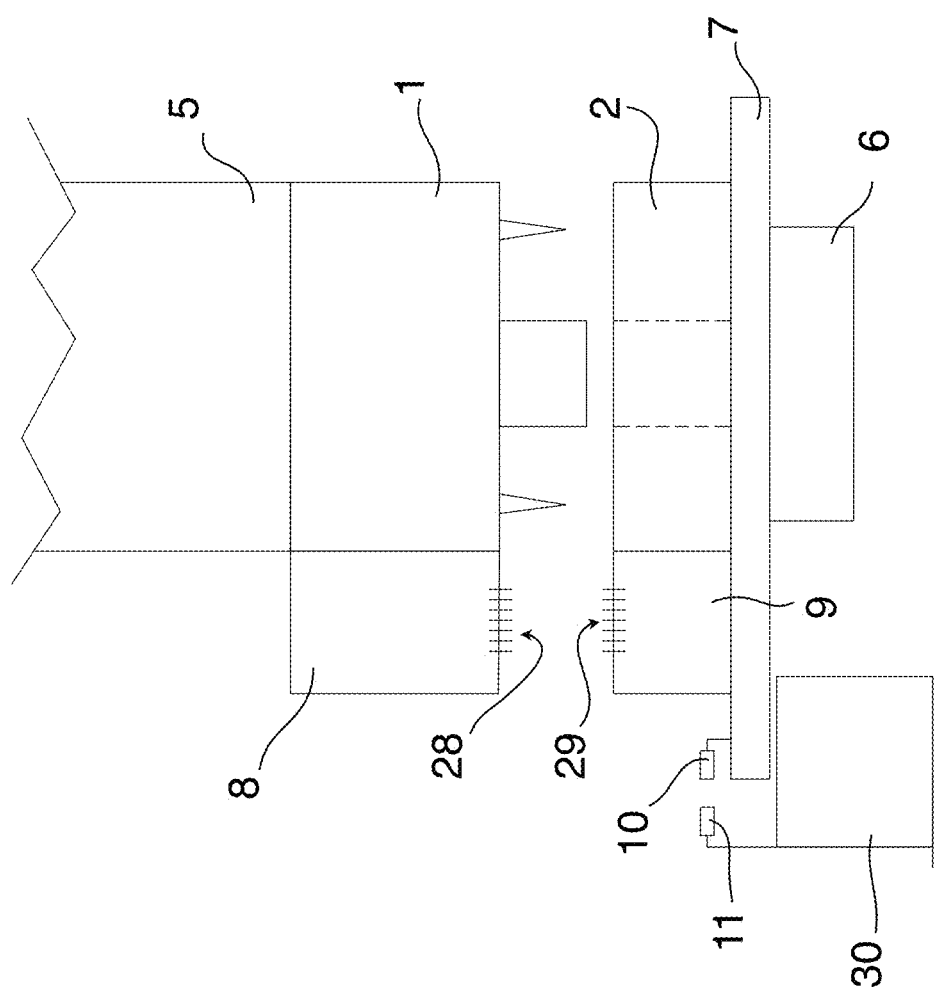
FIG. 2 shows a schematic lateral view of a tool changer device according to the present invention.
Figure 3:
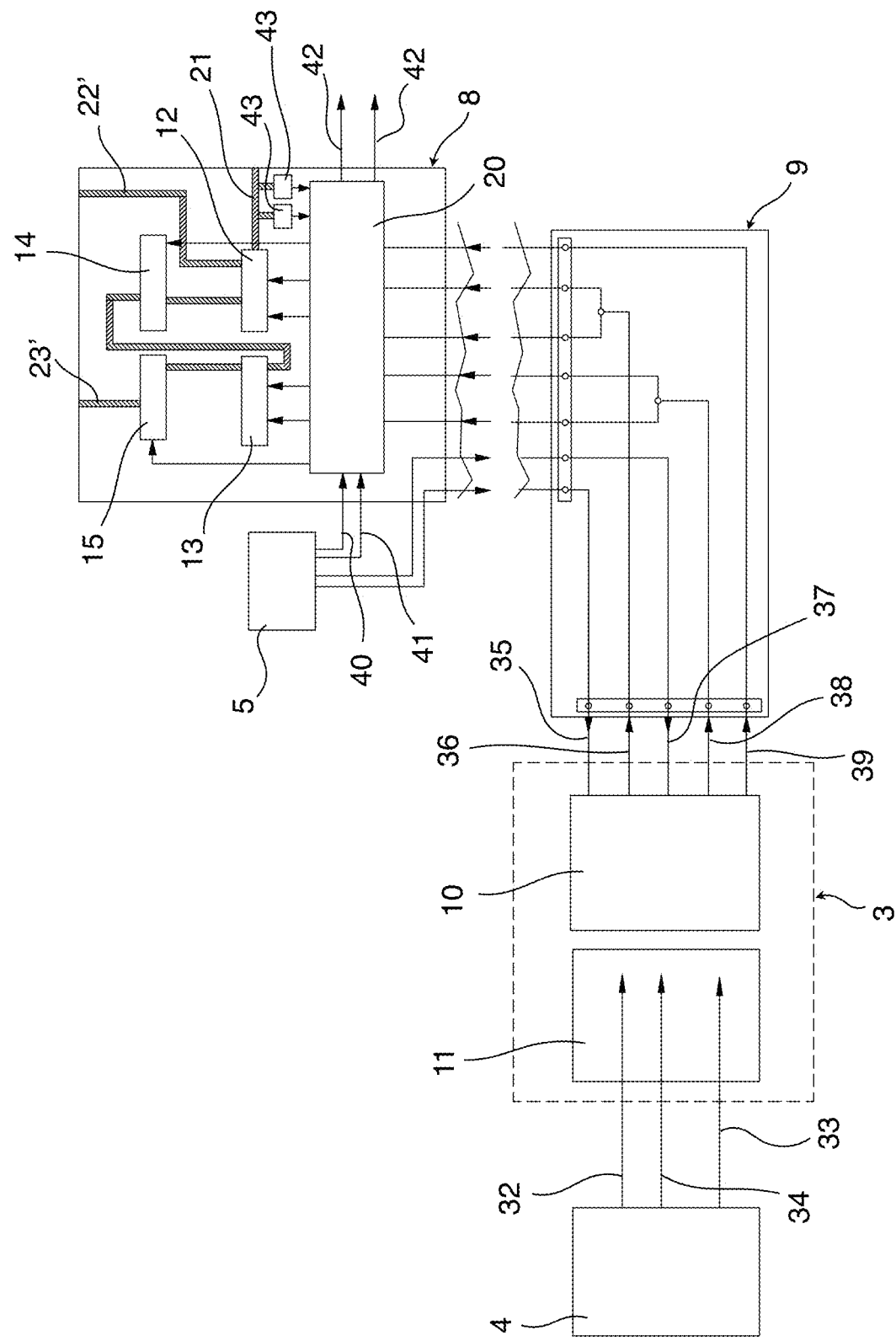
FIG. 3 shows a schematic view of the safety modules according to the present invention.

According to one of the embodiments of the present invention, illustrated in FIGS. 1 to 3, a tool changer can be activated by compressed air, and comprises a robot adapter 1, particularly adapted to be connected to a robotic arm 5, and a tool adapter 2, particularly adapted to be connected to a tool holder plate 7 for the housing of a tool 6.

The robot adapter 1 comprises a pneumatic cylinder, preferably, but not limited to, a double effect pneumatic cylinder 117, composed of a cylinder 17, or pneumatic chamber, and a piston 116 arranged slidably within the cylinder 17. The piston 116 comprises in turn a flat portion 16, or head, in a sealed manner against the walls of the cylinder 17, preferably with the aid of a sealing element, e.g. an O-ring 118. The piston 116 further comprises a shaft 119 connected to an engagement element 120 particularly adapted to be engaged, at an end thereof, with a tool 6. As will appear more clearly below, the pneumatic cylinder 117 is particularly adapted to activate a coupling/uncoupling mechanism of the robot adapter 1 and a tool 6.

The tool changer can naturally also be activated manually, electrically, hydraulically or in another way, without thereby departing from the scope of the present invention.

In the event of a pneumatic tool changer as in the appended images, the air is supplied inside the cylinder 117 through a couple of air conduits, an uncoupling air conduit 23 and a coupling air conduit 22. A first end of the uncoupling air conduit 23 and of the coupling air conduit 22 opens into the cylinder 117, and a second end thereof opens outside of the robot adapter 1. The air conduits 22, 23 are obtained along the vertical extension of the pneumatic chamber 17. In particular, the uncoupling air conduit 23 is positioned in correspondence of the upper portion of the pneumatic chamber 17, while the coupling air conduit 22 is positioned in correspondence of the lower portion of the pneumatic chamber 17. The air is selectively supplied inside the cylinder 117 through the uncoupling air conduit 23 and the coupling air conduit 22, to the two sides of the head 16 of the piston 116 by one or more solenoid valves 12, 13, which may be bi-stable or mono-stable.

Naturally, it is possible to envisage the air conduit 22 for the uncoupling air and the air conduit 23 for the coupling air, without changing the operation of the tool changer device and therefore without thereby departing from the scope of the present invention.

The head 16 may assume, in use, two separate and defined positions corresponding, for example, but not limited to, the ends of the stroke of the piston 116 within the cylinder 17. A first position corresponds to the coupling of the robot adapter 1 to the tool adapter 2, and a second position corresponds to the uncoupling of the tool adapter 2 to the robot adapter 1. A detection of the position of the piston 116 makes it possible to determine whether the tool changer is in the coupled or uncoupled, and therefore consequently whether the valves, in the case of a pneumatic tool changer, have completed their activation.

For the purpose of safety control for a tool changer, it is certainly advantageous to detect the position of the piston 116 rather than detecting the position of the solenoid valves as the compressed air may not reach the cylinder 17 and therefore not activate it or activate it in an incomplete or incorrect way.

According to a particularly advantageous characteristic of the present invention, the position of the piston 116 in the pneumatic cylinder 17, both in the coupled position and in the uncoupled position, and therefore the position of the coupling mechanism, is monitored by directly detecting the differential pressure of the two cylinder portions 17 at the two sides of the head 16 of the piston 116, both in the coupled position and in the uncoupled position.

As illustrated in FIG. 1, the robot adapter 1 comprises four air conduits 24, 25, 26 and 27 obtained on one of the lateral walls thereof. A first end of each air conduit 24, 25, 26, 27 opens into the cylinder 17, and a second end thereof opens outside of the robot adapter 1. Two first conduits 24, 25 are obtained along the vertical extension of the pneumatic chamber 17 so that the position of the head 116 of the piston 16 in the uncoupled tool changer status is intermediate between the two conduits 24, 25. The other two second conduits 26, 27 are obtained along the vertical extension of the pneumatic chamber 17 so that the position of the head 116 of the piston 16 in the uncoupled tool changer status is intermediate between the two conduits 26, 27.

Naturally, it is possible to envisage the two first conduits 24, 25 being relative to the uncoupled tool changer position and the second conduits 26, 27 being relative to the coupled tool changer position, without changing the operation of the tool changer device and therefore without thereby departing from the scope of the present invention.

The tool changer device further comprises a first differential pressure sensor 18 connected to at least two of the through conduits 24, 25, and a second differential pressure sensor 19 connected to another two of the through conduits 26, 27. Each differential pressure sensor 18, 19 comprises two compressed air ports.

The differential pressure sensors 18, 19 only operate in one direction, in the sense that the sensor returns a positive, or negative, electrical output signal only if a designated port is at a higher, or lower, pressure, than the other port, and not vice versa.

In the event of equal pressure at the ports of a differential sensor 18, 19 such sensor 18, 19 generates an electrical signal with a null value.

Each differential pressure sensor 18, 19 can have either an analog electrical output, e.g. voltage or current, or a digital output, e.g. pre-calibrated to a threshold value, and can be connected to an electrical circuit 31 for processing the output signal thereof.

In use, the differential pressure that generates the coupled status signal is detected between the conduits 26 and 27 connected to the pneumatic chamber 17. The conduit 27 is connected to a port of the differential pneumatic sensor 19 and the conduit 26 to the other port of the same sensor 19. When the air is supplied, and the coupled status has been reached, the conduit 27 will not receive air, whereas the conduit 26 will receive positive pressure. This generates the differential required to activate the sensor: therefore, an electrical output signal is produced by the differential sensor (analog or digital). An electrical circuit can be used for setting a threshold for the desired pressure level.

Still in the coupled tool changer situation, the second differential pressure sensor 18 is supplied through the compressed air conduits 24 and 25. Therefore, the two ports are at the same pressure level and the sensor 18 does not generate any electrical output signal.

The same operation is used for generating the uncoupled status signal, where the conduit 25 is connected to a port of the second pressure sensor 18, and the conduit 24 is connected to the other port of the same sensor 18.

It appears clear that under normal operating conditions the electrical signals generated by the two pressure sensors 18, 19 are antivalent, i.e. each sensor generates an output signal having the opposite value to the other.

If the mechanical coupling system gets stuck in an intermediate position between the two designated ones for the effective coupling or uncoupling of the system, and the head 16 of the piston 116 is between the conduits 25 and 26, the pressure difference at the ports of the two sensors 18, 19 would not be satisfied, producing an electrical output signal with a different value from the normal operating one.

If the air pressure was zero, the pressure differential would not be satisfied either, again producing an abnormal electrical output signal.

In the same way, if the air pressure was insufficient according to the operating parameters established by the tool changer manufacturer, the pressure difference would generate an abnormal electrical output signal.

If an air loss was to occur in the pneumatic chamber 17, e.g. between one side and the other of the head 16 of the piston 116 or a seal loss, the system would not be able to reach the required differential pressure to activate the electrical output signal, as the ports of both differential sensors would be supplied by air, therefore not creating a differential pressure condition between the ports sufficient to activate the electrical signal of one or both of the sensors.

As the two electrical output signals from the two pressure sensors are antivalent, if one of the two sensors fails, the problem would be detected prior to or upon the subsequent safety function request, i.e. of the activation of the piston for performing coupling or uncoupling. In the same way, any electrical short circuit between each of the two output and power supply signals, or between the two output signals, would be detected prior to the subsequent safety function request.

In a normal operating, and not tool changing, condition of a robotic equipment, in which the robot adapter 1 is coupled to the robotic arm 5, a tool 6 is coupled to the robot adapter 1 by means of the tool adapter 2 and the tool carrier plate 7, the compressed air supplied to the pneumatic cylinder 117 guarantees safe coupling.

According to a further technical characteristic of the present invention, the robot adapter 1 comprises a resilient element, preferably, a compression spring, arranged within the pneumatic cylinder and insistent on one side on the head 16 of the piston 116 and on the other on one of the bottom walls of the cylinder 17. In use, if the compressed air at the tool changer (or in general the energy necessary for safe operation) is lost, the tool changer would remain coupled, as the well-tried compression spring (redundancy safety mechanism) in the robot adapter 1 would prevent the uncoupling of the tool adapter.

Otherwise, in an operating condition of the tool changer, the tool 6 must be uncoupled from the robotic arm 5, and it is necessary to send a command signal to one or more of the pneumatic activation valves, positioned on the robotic arm 5 either solidly constrained to the robot adapter 1 or in a control module installed on the robot adapter 1 itself.

In the present invention, the tool changer command signal may be transmitted to one or more uncoupling valves only when the robot adapter 1 is coupled to the tool adapter 2 and both are in a parking station 30.

In any other position, an uncoupling command signal cannot be transmitted in any way to the robot adapter 1.

This operation is made possible by a signal transmission system. The transmission system comprises a command signal receiver 10, fixed to the tool adapter 2 or to a plate 7 solidly constrained to the tool adapter 2, or to the tool 6, and a command signal transmitter 11, engaged with the parking station 30. The signal transmission may be by contact or not by contact, and the signal may be indifferently of the mechanical, pneumatic or hydraulic, magnetic, induction, RFID, optical type, etc.

According to one of the possible embodiments of the present invention, the transmission system may also provide an electrical "in-zone" signal 39. The transmission of the "in-zone" signal 39 takes place when the transmitter 11 and the receiver 10 are in a position such as to be able to transmit a command.

This proximity signal can also be provided by a further mechanical, magnetic, optical or electronic sensor.

As illustrated in FIG. 3, the command signals, for coupling or for uncoupling, are sent by a control PLC 4 connected to the command transmitter 11.

When the tool adapter 2 is transported by the robot adapter 1 into its parking station 30, the transmitter 11 and the receiver 10 are in a proximity condition that allows them first to enable and subsequently to operate the transmission of a command, e.g. a coupling signal 34 or an uncoupling signal 33.

According to another of the preferred embodiments of the present invention, the tool changer device comprises a robot adapter safety module 8, connected to the robot adapter 1, and a tool adapter safety module 9, connected to the tool adapter 2.

When the tool adapter 2 is coupled to the robot adapter 1, the control signal is transmitted through electrical contacts 29 arranged on the tool adapter safety module 9 of the tool adapter 2 and electrical contacts 28 arranged on the safety module 8 of the robot adapter 1.

The command therefore reaches the robot adapter safety module 8 on the robot adapter 1, and the robot adapter safety module 8 comprises a safety control circuit 20. The safety control circuit 20 may be indifferently an electrical and/or pneumatic circuit with a safety control function.

The safety control is realized to prevent the uncoupling of the tool changer in unsafe conditions.

Consequently, the architecture of the safety control of this invention has two channels (for realizing a redundancy) that make cross monitoring between them, e.g. by means of relays with forcibly guided contacts. The two-channel architecture allows to prevent a single failure leading to the loss of the safety function.

If all the safety conditions for the uncoupling of the tool changer are satisfied, the control logic sends the command signal to two actuation devices arranged within the safety control circuit 20.

The actuation devices may be, for example, two bi-stable pneumatic solenoid valves 12, 13, each with two solenoids, of which one solenoid is connected to an electrical coupling command 38 and the other to an electrical uncoupling command 36.

The air conduits at the outlet of the solenoid valves 12, 13 are connected in series between them and with the air conduct 23'. The first air conduct 23' is suitable to supply air to the cylinder 17 from the side that activates the uncoupling, and in particular to supply air to the uncoupling air conduit 23. The second air conduct 22' is suitable to supply air to the cylinder 17 from the side that activates the coupling, and in particular to supply air to the coupling air conduit 22.

Thanks to this configuration, only in the case of activating both the bi-stable pneumatic solenoid valves 12, 13 the uncoupling air conduit 23 is supplied (AND pneumatic logic). It is instead sufficient to activate just one of the bi-stable valve coupling solenoids 12, 13 for supplying the cylinder 17 from the side that activates coupling through the air conduit 22 (OR pneumatic logic).

The monitoring of the actuation takes place by directly detecting the position of the piston rather than detecting the position of the solenoid valves 12, 13. This allows more direct and therefore safer detection of the coupling mechanism.

For that purpose, the detection system with differential pressure sensors 18 and 19 previously described is used.

The differential pressure detection system also allows missing or insufficient air pressure to be detected (dangerous system failure) and blocks the subsequent uncoupling request (safety function request).

The safety control logic also incorporates a protection against the unexpected start-up after the recovery of the compressed air supply, e.g. after a situation of improper positioning of the piston 116 in the pneumatic cylinder 17, or loss of pressure or insufficient pressure, or air leakage, or failure of one of the two differential pressure sensors.

The restart after the loss of compressed air and after the recovery of the compressed air is only made possible if the electrical "in-zone" signal 39 is in a high condition. The high condition is generated by the receiver 10 only when it is near to the transmitting base 11, therefore when the tool changer is in the parking station 30 and the uncoupling does not create any hazard. Also, in the situation of loss of electrical power supply and subsequent recovery in the presence of pneumatic power supply, the restart of the safety control is only made possible by the high electrical "in-zone" signal 39.

The safety control circuit 20 also generates for the use of a master safety controller (typically present in robotic systems) a double electrical output signal 42, that is antivalent (a high and a low signal, or vice versa) to facilitate the detection of a short circuit or of the overlapping of the two output signals.

The greatest safety risks can indeed occur in the manual or semi-automatic operating stages, often due to the loss of one or more supply energies (e.g. pneumatic energy).

For that purpose a safety function has also been included to prevent dangerous uncoupling in the event that the operator ignores the electrical safety signals provided by the safety control according to the present invention, or the user does not integrate them into their safety control measures and the operator activates the robot with the tool changer in the absence of air supply (primary energy source for the safety of the tool changer).

This could lead to activating the uncoupling command when the tool changer is in the parking station. If the air supply was lost prior to the command, the tool changer would not uncouple, but because of the redundant mechanical safety system (e.g. a spring) which replaces the action of the air it would remain coupled. Or if it was already uncoupled and the air was lost, it would be re-coupled because of the spring. If the operator ignored the safety signals warning of the loss of air, and moved the robot with the tool changer coupled, it would take the tool changer outside the parking station. When the air supply returned, having already activated the uncoupling command of the two bi-stable valves and the valves maintaining their position, the air would reach the uncoupling conduit releasing the tool and therefore causing a serious hazard.

This additional safety function can be performed by the circuit previously defined or, if necessary for specific applications, be realized with an extra circuit with double channel (redundant) architecture. This type of architecture makes it possible to prevent a single failure leading to the loss of the safety function.

Two additional pressure sensors 43 are both connected to an air conduit on the pneumatic supply 21 of the robot adapter safety control module 8.

Figure 6:
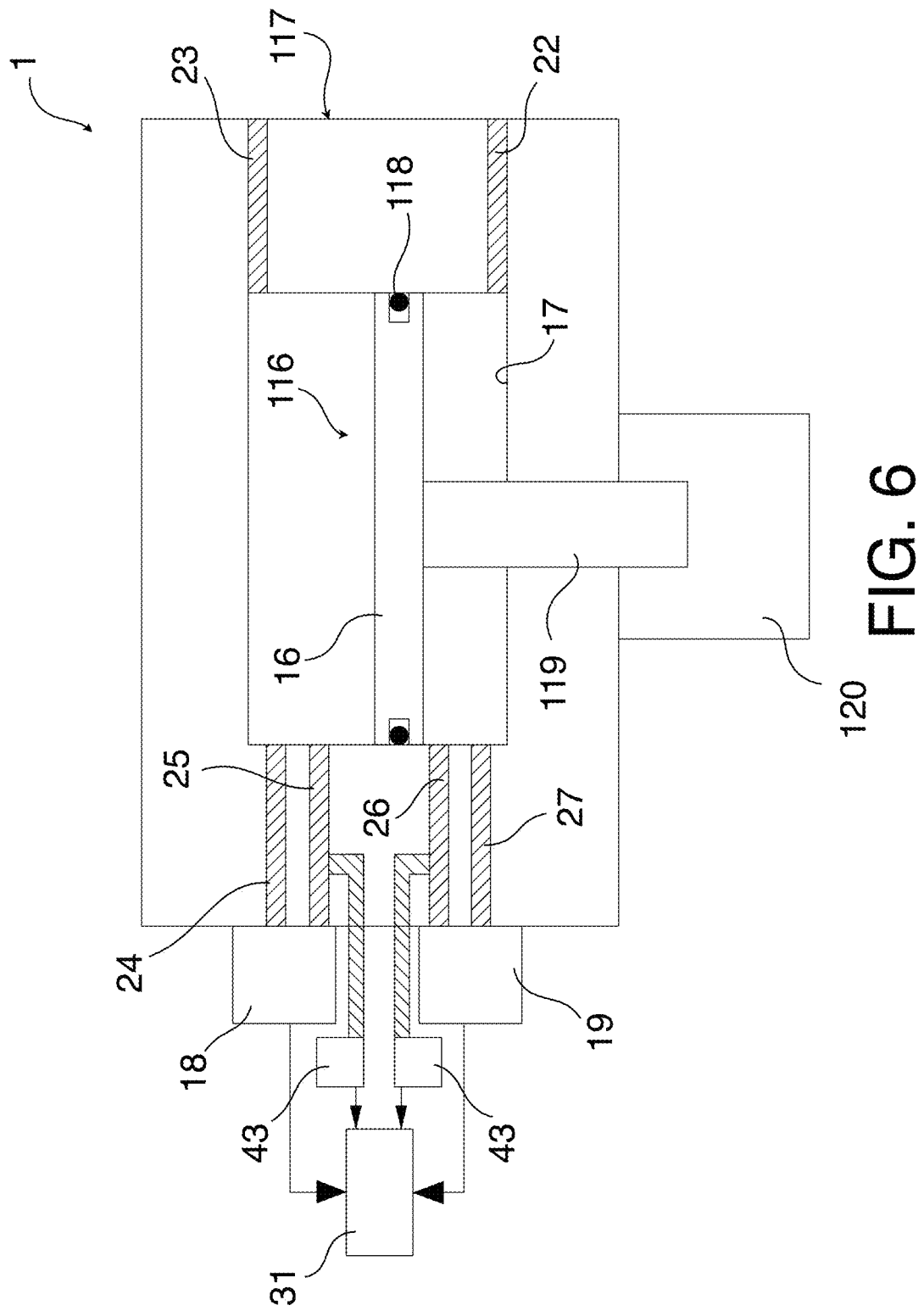
FIG. 6 is a schematic sectional view of another alternative of the robot adapter according to the present invention.

According to a possible alternative of the present invention, as shown in FIG. 6, the two additional pressure sensors 43 can both be connected to at least two 25, 26 of the four through conduits 24, 25, 26, 27 of the pneumatic cylinder to sense the air pressure inside the cylinder.

Each pressure sensor can have either an analog electrical output (voltage or current), or a digital output (pre-calibrated to a threshold value) and can be connected to an electrical circuit for processing the output signal thereof. It may also be a double output safety sensor.

The electrical signals of these pressure sensors act on a control logic with two channels (for realizing a redundancy), channels that make cross monitoring between them, e.g. by means of relays with forcibly guided contacts. This control logic is interconnected or part of the safety control circuit 20.

The robot adapter safety control module 8 also comprises two further actuation devices, for example two mono-stable solenoid valves 14 and 15 with a mechanical spring, with a default position corresponding to blocking the uncoupling air supply conduit 23 of the tool changer. The two further actuation devices 14 and 15 are in series in the pneumatic uncoupling circuit of the bi-stable valves 12, 13 for supplying the air conduit 23', so that in order to uncouple the tool changer four valves must be in the suitable status.

Being mono-stable valves, in the event of loss of the electrical and/or pneumatic power supply, the valves automatically return to the uncoupling channel blocking position. This is known as the principle of de-energization: if energy is removed, the machine or the part of the machine must be brought into a safe state.

The safety control logic also incorporates a prate ion against unexpected start-up after the recovery of the compressed air supply.

The restart after the loss of compressed air and after the recovery thereof is only made possible by the high electrical "in-zone" signal 39, a condition generated by the receiver 10 only when near to the transmitting base 11, therefore when the tool changer is in the parking station 30 and the uncoupling does not create any hazard.

On the contrary, in the event of lack of consistency of the two input signals from the pressure sensors 43, the system is blocked as long as the electrical power supply of the inputs remains. This allows the immediate detection of the failure of one of the two pressure sensors 43. Upon the restart of the electrical power supply of the inputs, the air pressure (started by the electrical power supply of the outputs) is typically absent, and therefore in the case of inconsistency of the signals from the pressure sensors 43, the system is blocked again, until the failure has been resolved by operator intervention or the robot adapter safety module 8 is replaced by a new and fully operating one.

The monitoring of the logic of this second safety function is in series with the monitoring of the primary safety function, i.e. together they generate for the use of a safety controller of the user a double electrical output signal 42 with antivalent logic, to facilitate the detection of a short circuit or the overlapping of two output signals.

Figure 5:
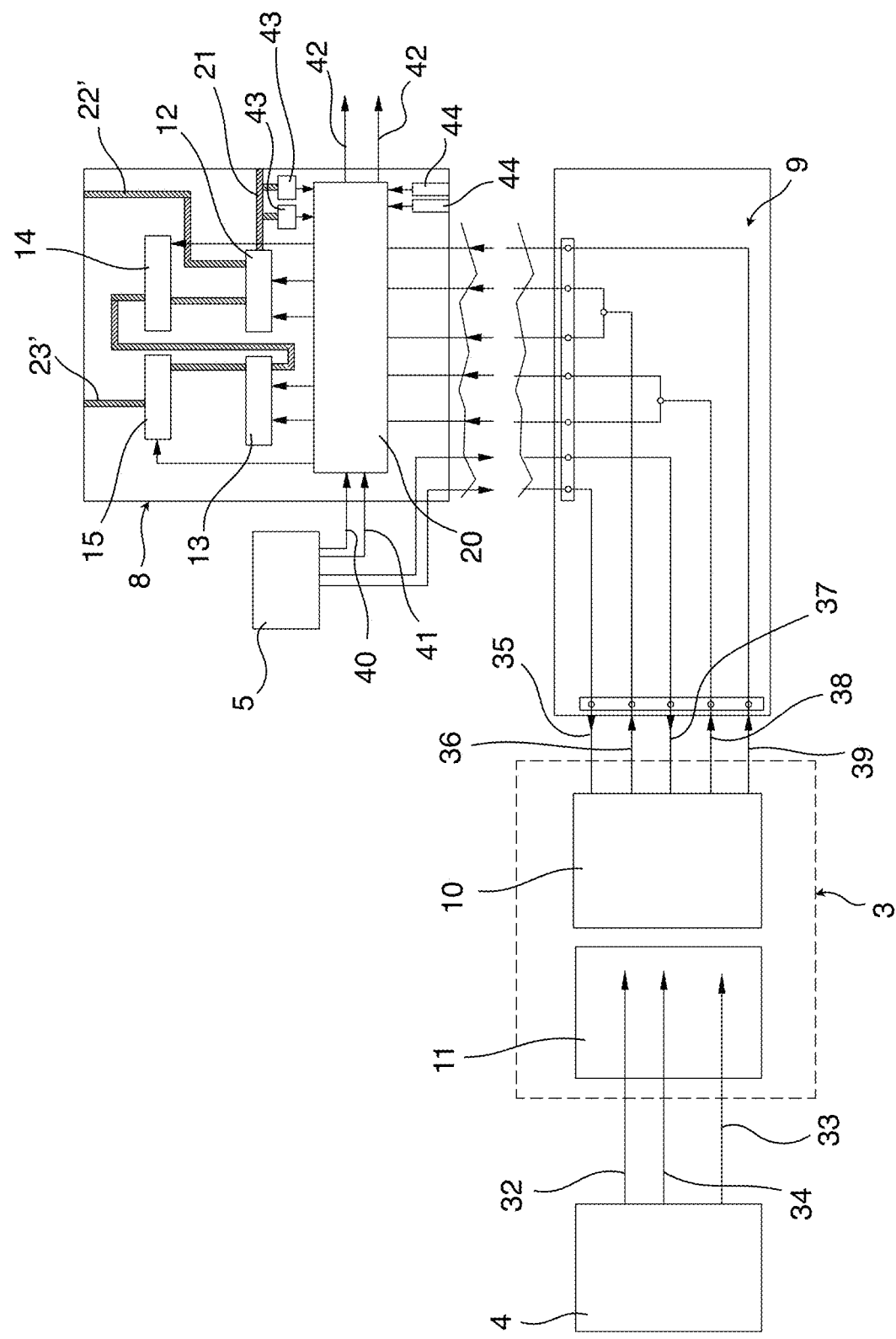
FIG. 5 is a schematic view of another embodiment of the safety modules according to the present invention.

According to another embodiment of the present invention, as shown in FIG. 5, the tool changer device further comprises at least a tool presence sensor, which is particularly adapted to detect the coupling of the tool adaptor 2 to the robot adaptor 1. The tool presence sensor might comprise a dual-channel sensor or two single-channel sensors 44, as shown in FIG. 5, without departing from the scope of the present invention.

The tool presence sensors 44 can be indifferently of a mechanical type, or inductive or magnetic, RFID, optical or any other type.

As shown in FIG. 5 the tool presence sensors 44 may be located in the robot adapter safety module 8, so that the outputs of the tool presence sensors 44 may be connected to the safety control circuit 20.

The tool presence sensors 44 allow to discriminate two different statuses of the tool changer device: when the tool adapter 2 is coupled to the robot adapter 1 or the tool adapter 2 is not coupled to the robot adapter 1.

For example, after a loss of compressed air, the redundant mechanical safety system (e.g. a spring) drives the coupling/uncoupling mechanism 17 to a coupled position.

After the compressed air recovery, if the tool adapter 2 is coupled with the robot adapter 1, it would be very dangerous to actuate the mechanism 17. On the other hand, in the case that the tool adapter 2 is not coupled with the robot adapter 1, after the compressed air recovery it is safe to actuate the mechanism 17 to the uncoupled position.

One solution to this problem after air recovery could be to leave the coupling/uncoupling mechanism 17 in the same position driven by the redundant mechanical safety system (e.g. a spring), i.e. in the coupled position. However, this solution would cause other mechanical issues when the robot adapter 1 needs to couple the tool adapter 2 resting in its parking station 30 in an automatic way.

The tool presence sensors 44 can be used by a logic to determine if the robot adapter 1 can be brought back to the situation it was before losing the compressed air supply.

In the present invention the further additional sensors 44 allow the safety control circuit 20 to determine if the tool adapter 2 is coupled to the robot adapter 1, and therefore after the air recovery to automatically and safely actuate the mechanism 17 to the uncoupled position. All the details can be replaced with other technically-equivalent elements. Likewise, the materials used, and the contingent shapes and sizes, may be any according to the requirements but without thereby departing from the scope of protection of the following claims.

LIST of REFERENCE NUMBERS

1. Robot adapter
2. Tool adapter
3. Transmitter/receiver
4. Control PLC
5. Robot
6. Tool
7. Tool carrier plate
8. Robot adapter safety module
9. Tool adapter safety module
10. Receiver
11. Transmitter
12. Bi-stable valve
13. Bi-stable valve 14. Mono-stable valve
15. Mono-stable valve
16. Piston head
17. Coupling/uncoupling mechanism activation cylinder
18. Differential pressure sensor 1
19. Differential pressure sensor 2
20. Safety control circuit
21. Pneumatic supply
22. Coupling air conduit
23. Uncoupling air conduit
24. Conduit
25. Conduit
26. Conduit
27. Conduit
28. Robot adapter side safety module electrical contacts
29. Tool adapter side safety module electrical contacts
30. Parking station
31. Differential pressure sensor detection electronics
32. GND output power supply
33. Uncoupling command
34. Coupling command
35. Output power supply
36. Uncoupling command
37. GND output power supply
38. Coupling command
39. "in-zone" signal
40. Input power supply
41. GND input power supply
42. Safety electrical signals
43. Pressure sensors connected to the air supply
44. Tool presence sensors
116. Piston
117. Pneumatic cylinder
118. O-ring
119. Shaft
120. Coupling and uncoupling mechanism

The invention claimed is:

1. A tool changer device for a robotic arm, comprising:
a robot adapter adapted to be connected to a robotic arm and to a tool;
a coupling and uncoupling mechanism connected between the robotic arm and the tool;
the robot adapter comprising a pneumatic cylinder and a piston slidably arranged inside the pneumatic cylinder for activating the coupling and uncoupling mechanism to couple the robotic arm and the tool or to uncouple the robotic arm from the tool, the robot adapter having at least one wall;
at least four through conduits arranged on the at least one wall of the robot adapter, one end of said at least four through conduits opens into the pneumatic cylinder and another end of said at least four through conduits opens outside of the pneumatic cylinder; and
a first differential pressure sensor connected to at least two of the at least four through conduits; and
a second differential pressure sensor connected to other two of the at least four through conduits.

2. The tool changer device according to claim 1, wherein the first and second differential pressure sensors comprise at least two compressed air inlet ports, said at least two compressed air inlet ports being in fluid connection with said at least four through conduits.

3. The tool changer device according to claim 2, wherein the first and second differential pressure sensors comprise at least one output adapted to provide an analog or digital output signal to an electrical processing circuit.

4. The tool changer device according to claim 1, further comprising a tool adapter adapted to be connected to a tool.

5. The tool changer device according to claim 4, further comprising a robot adapter safety module connected to the robot adapter, and a tool adapter safety module connected to the tool adapter.

6. The tool changer device according to claim 5, wherein the robot adapter safety module comprises a safety control circuit.

7. The tool changer device according to claim 6, wherein the safety control circuit comprises two actuation devices connected in series and with an uncoupling conduit adapted to supply the pneumatic cylinder for activating the coupling and uncoupling mechanism to uncouple the robotic arm and the tool.

8. The tool changer device according to claim 7, one of said actuation devices is connected to a coupling conduit adapted to supply the pneumatic cylinder for activating the coupling and uncoupling mechanism to couple the robotic arm and the tool.

9. The tool changer device according to claim 8, wherein the two actuation devices comprise bi-stable pneumatic solenoid valves.

10. The tool changer device according to claim 5, wherein the robot adapter safety module comprises an extra safety circuit, said extra safety circuit comprising two pressure sensors connected to a pneumatic supply air conduit of the safety control module or connected to at least two of the through conduits arranged on the pneumatic cylinder of the robot adapter, and two actuation devices connected in series and with an uncoupling conduit.

11. The tool changer device according to claim 5, further comprising at least a tool presence sensor adapted to detect coupling of the tool adapter to the robot adapter.

12. The tool changer device according to claim 11, wherein the tool presence sensor is located in the robot adapter safety module).

* * * * *